US008768792B2

(12) United States Patent
Cooper et al.

(10) Patent No.: US 8,768,792 B2
(45) Date of Patent: Jul. 1, 2014

(54) AD-BEARING BOOKMARKS FOR ELECTRONIC MEDIA DOCUMENTS

(75) Inventors: Michael Cooper, Vashon, WA (US); Christine Ahonen, Monroe, WA (US)

(73) Assignee: Microsoft Corporation, Redmond, WA (US)

(*) Notice: Subject to any disclaimer, the term of this patent is extended or adjusted under 35 U.S.C. 154(b) by 1487 days.

(21) Appl. No.: 11/958,380

(22) Filed: Dec. 17, 2007

(65) Prior Publication Data

US 2009/0157502 A1 Jun. 18, 2009

(51) Int. Cl.
*G06F 17/50* (2006.01)
*G06Q 30/00* (2012.01)
*G06Q 30/02* (2012.01)

(52) U.S. Cl.
CPC .............. *G06Q 30/00* (2013.01); *G06Q 30/02* (2013.01); *G06Q 30/0241* (2013.01); *G06Q 30/0276* (2013.01); *G06Q 30/0277* (2013.01)
USPC .......................................................... 705/29

(58) Field of Classification Search
CPC ... G06Q 30/00; G06Q 30/02; G06Q 30/0241; G06Q 30/0276; G06Q 30/0277
USPC .......................................................... 705/29
See application file for complete search history.

(56) References Cited

U.S. PATENT DOCUMENTS

| 5,199,104 | A | * | 3/1993 | Hirayama | 715/776 |
| 5,534,888 | A | * | 7/1996 | Lebby et al. | 345/672 |
| 6,486,891 | B1 | | 11/2002 | Rice | |
| 6,496,803 | B1 | | 12/2002 | Seet et al. | |
| 6,698,020 | B1 | * | 2/2004 | Zigmond et al. | 725/34 |
| 6,718,365 | B1 | | 4/2004 | Dutta | |
| 6,892,181 | B1 | | 5/2005 | Megiddo et al. | |
| 7,059,637 | B2 | | 6/2006 | Stewart et al. | |
| 7,509,270 | B1 | * | 3/2009 | Hendricks et al. | 705/26 |
| 2002/0116525 | A1 | | 8/2002 | Peters et al. | |
| 2002/0188532 | A1 | * | 12/2002 | Rothstein | 705/29 |
| 2002/0190965 | A1 | | 12/2002 | Lemon | |
| 2003/0028432 | A1 | * | 2/2003 | Troyansky et al. | 705/14 |
| 2005/0120940 | A1 | | 6/2005 | Sinclair et al. | |
| 2007/0156627 | A1 | | 7/2007 | D'Alicandro | |

FOREIGN PATENT DOCUMENTS

EP 1030247 A2 8/2000
WO 0048057 A2 8/2000

OTHER PUBLICATIONS

Design2Express.com (www.design2express.com).*
"AF&NM Advertising", http://www.aviationindustrygroup.com/index.cfm?pg=44.
"Pronet Advertising", http://www.pronetadvertising.com/articles/making-your-content-delicious.html.
Cooper, et al.,"Advertising campaign on a major internet search engine to promote colorectal cancer screening", http://www.bmj.com/cgi/content/full/328/7449/1179?etoc&eaf.

* cited by examiner

*Primary Examiner* — Daniel Felten
(74) *Attorney, Agent, or Firm* — Tony Azure; Andrew Sanders; Micky Minhas

(57) ABSTRACT

An electronic bookmark can be used to render an advertisement at a bookmark insertion point (e.g., a stopping point) determined by a user when reading an electronic media document, such as an electronic book, newspaper, magazine, audiobook, and video, among others. Some of the variations provided herein include providing notice to an outside source providing the advertisement when user interaction with the bookmark occurs, as well as selecting advertisements based upon one or more criteria, including criteria related to the electronic media document and demographic information of the user.

20 Claims, 9 Drawing Sheets

```
┌─────────────────────────────────────────────┐─ 32
│ Microsoft Reader          kids@Random       │
│                      ( KIDS ( TEENS ( TEACHERS ( LIBRARIANS │
│   Imponderables®Science                     │
│                       What's New            │
│                       Mama, I'll Give You   │
│                       the World             │
│                       by Roni Schotter      │
│                       illustrated by Susan  │
│                       Saelig Gallagher      │
│    WHAT PRECISELY IS SEA LEVE Hardcover   Mama, I'll Give │
│    THEY DETERMINE EXACTL It's Mama's birthday You the World │
│                       and, for one night, Luisa wants to make │
│                       Mama smile... the way she smiles in an │
│                       old photograph of her dancing at a place │
│                       Favorites   ( SEE ALL OF OUR MINI-SITES │
│                                             │
│                         Dr. Seuss      Thomas│
│  Painstakingly. Obviously, the sea level i            & Friends│
│  constantly changing. If you measure the oce  Magic   Sesame│
│  high tide, you won't come up with the same  Tree    Street│
│                                      House          │
│  ric shifts also affect the elevation of the seas           │
│     But the oceans are joined and their h  Junie B. Golden│
│  geodesists (mathematicians who specialize Jones   Books│
│  ment) and oceanographers settle for an app            │
│  ché that "water seeks its own level" is tr       ecause th  │
│  about sea level variations over time than       esists worry more │
│  ments are taken all over the globe; there is no one place where sea │
│  level is determined. One sea level fits all. │
│     The National Geodetic Survey defines "mean sea level" as the │
│  "average location of the interface between ocean and atmosphere, over │
│  a period of time sufficiently long so that all random and periodic varia- │
│  tions of short duration average to zero." The U.S. National Ocean Ser- │
│  vice has set 19 as the appropriate number of years to sample sea levels │
│  to eliminate such variations; in some cases, measurements are taken on │
│  an hourly basis. Geodesists simply add up the 19 years of samples and │
│  divide by 19 to arrive at the mean sea level. │
│     The mean sea level has been rising throughout most of the twenti- │
│  eth century—on average, over a millimeter a year. On a few occasions, │
│                                             │
│                    ◄  108  ►                │
└─────────────────────────────────────────────┘
                                              ╲ 30
                    FIG. 3
```

AD-BEARING BOOKMARKS FOR ELECTRONIC MEDIA DOCUMENTS

BACKGROUND

With the advent of small, portable computers and personal digital assistants (PDAs), users can take larger portions of information with them for consumption while away from the desk. To satisfy this need, publishers have begun to provide more substantial electronic media documents. An example of an electronic media document is a book that has been converted to electronic form for download and display. Electronic books have been developed for PDAs such as the Palm™ and Windows CE™ devices.

In addition, some suppliers have developed devices that are designed specifically for the receipt, storage and display of electronic books. Such devices, for example, may be referred to as "electronic book readers." In general, such a reader is configured to display electronic books provided by the manufacturer of the reader. Advertisements (herein referred to as "ads") may be located randomly throughout the electronic book, spaced evenly throughout the electronic book, and/or clustered in one area of the book, such as the start, end, or center. Similar display methods can be provided to render or display electronic media documents.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

This disclosure presents a system and method for providing users with electronic media documents containing advertising in the form of an electronic representation of a bookmark. The bookmark allows the user to select the bookmark insertion point and to return to the bookmark insertion point upon restarting reading of the electronic media document, while simultaneously providing a position for placement of an ad within the electronic representation of the bookmark.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 3 is a screenshot of a portrait view of an electronic representation of a bookmark in accordance with an embodiment that utilizes the techniques described herein.

DETAILED DESCRIPTION

Figure 1:
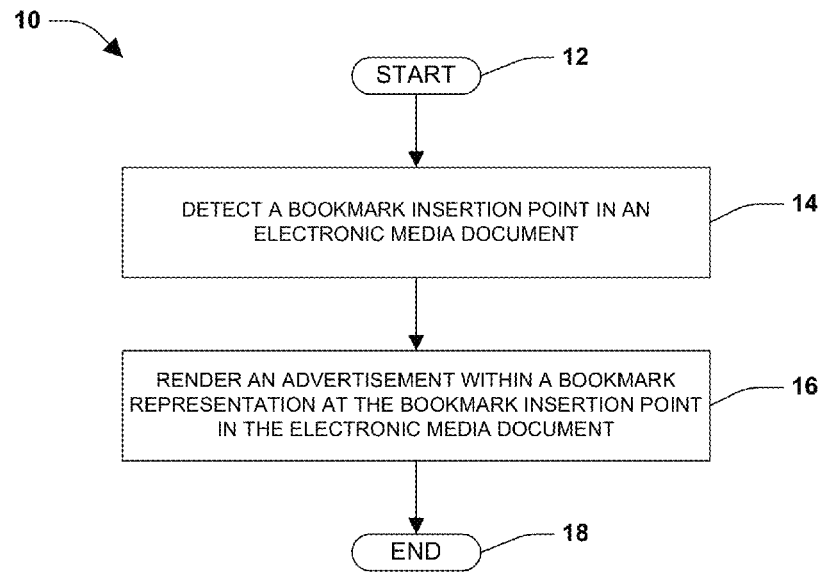
FIG. 1 is a flowchart illustrating an exemplary method of rendering an ad within an electronic bookmark in an electronic media document.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Systems and methods in accordance with these techniques can be implemented using any type of general purpose computer system, such as a personal computer (PC), laptop computer, server, workstation, personal digital assistant (PDA), mobile communications device, interconnected group of general purpose computers, and the like, running any one of a variety of operating systems. In some embodiments, systems and methods implemented in accordance with these techniques may incorporate and/or be usable with readers and reading component capable of rendering electronic media documents, such as "electronic books," tablet and notebook computers and screens, and the like.

For the purpose of explanation, embodiments of these techniques will be discussed in connection with the example of systems and methods associated with reading, viewing, and/or storing electronic media documents. It should be understood, however, that the foregoing explanation of these techniques may be equally applicable to other types of electronic media documents, such as magazines, newspapers, periodicals, reports, papers, brochures, catalogs, manuals, audiobooks, movies, videos, audio recordings, musical recordings, and the like, where content rendered for the user can be facilitated by the inclusion of a bookmark at a bookmark insertion point (e.g., where the user's consumption of the electronic media document may be stopped and restarted.)

FIG. 1 illustrates a method that may be adapted to incorporate techniques for rendering an ad within a bookmark representation according to an embodiment of the system 10 illustrated in FIG. 1. The method 10 begins at 12 and involves detecting a bookmark insertion point in an electronic media document 14. For example, the detecting 14 may comprise reading a bookmark insertion point associated with the electronic media document (e.g., a notation that the user stopped consuming the electronic media document at a particular point, or a flagging of the user of a particular point in the electronic media document for later reference.) The detecting 14 may also comprise monitoring the interaction of the user with the electronic media document and detecting a suggested bookmark insertion point (e.g., a point at which the user stops interacting with the document.) The method 10 also involves rendering an ad within a representation of a bookmark at the bookmark insertion point 16. As one example, where the electronic media document is a visual document such as an electronic book, the rendering 16 may comprise displaying an electronic representation of a bookmark, and overlaying a graphic ad within the electronic bookmark. As another example, where the electronic media document is an audio document such as an audiobook, the rendering may comprise an audible bookmark inserted at the bookmark insertion point (e.g., "The reading of this text by the author will now resume within chapter 12 . . ."), and the rendering of the audible ad 16 may comprise rendering the ad within the audible bookmark (e.g., "but first, a word from our sponsor about the author's next text . . .") Having generated the bookmark representation with an ad rendered therein from an ad memory described hereinafter, the method 10 achieves the purpose of rendering the ad at the bookmark insertion point, and so ends at 18.

Figure 2:
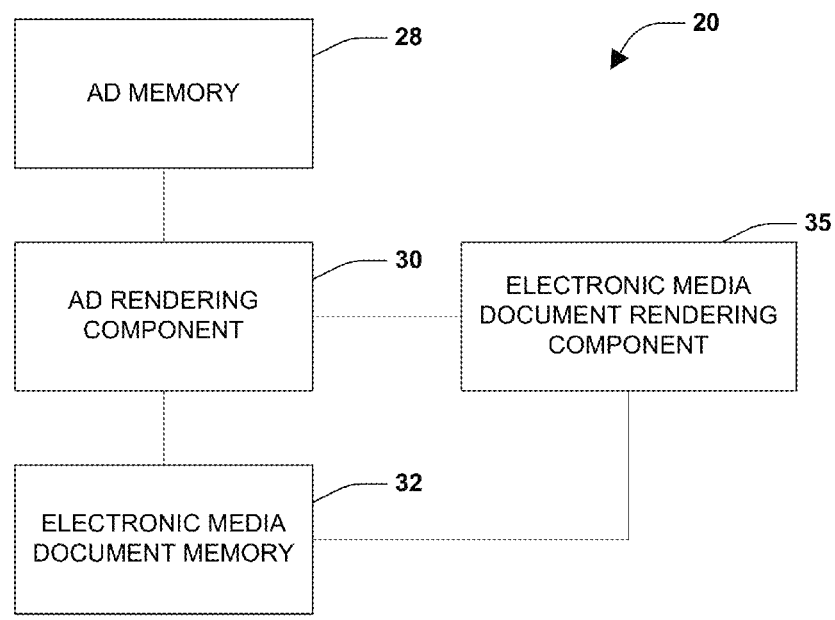
FIG. 2 is a system component diagram illustrating an exemplary system in accordance with an embodiment that utilizes the techniques described herein.

FIG. 2 illustrates an overview of the architecture of a representative system 20 implemented in accordance with one embodiment of these techniques. The system 20 includes an ad memory 28 coupled to an ad rendering component 30 with an electronic media document memory 32 and electronic media document rendering component 35. Each component in the system 20, in one embodiment, is capable of controlling its respective functions and responding to requests from the other components, and/or a user.

The system 20 may store ads in the ad memory 28. The ad memory 28 may comprise a volatile system memory, such as a system RAM or a high-performance memory cache; and/or a nonvolatile system memory, such as flash memory; and/or a nonvolatile storage memory, such as a hard disk drive or an optical medium. The ad memory 28 may be structured as a file system or portion thereof; and/or as a relational database; and/or as a hierarchically structured document such as an XML file; or any combination thereof (e.g., as an ad index stored in a relational database having pointers to ad graphics stored as files in the file system.) The ad memory 28 may also be provided with the system to the user with pre-loaded ads, and/or may be filled with ads received in the course of using the device. Alternatively or additionally, the ad memory 28 may comprise a portion of the memory containing the electronic document, e.g., where the ad is (upon receipt and/or selection) embedded in the electronic media document. In one such embodiment, the embedding may be ephemeral, e.g., where the advertisement is not stored for later rendering, but rather is inserted into a currently rendered electronic media document. For example, an audio stream, such as a radio program, may be sent to the system in streamed portions, and an audio ad may be received and mixed with (e.g., spliced into) the audio stream for prompt or immediate rendering.

Ads may be received from an outside source that inserts the ads into the ad memory 28. The outside source can include one or more of a media retail store, a publisher, a distributor, an author, a software manufacturer, a manufacturer of the electronic media document rendering component, and the like. For example, a publisher or author may provide ads based on other books by the same author, while a media retail store may provide ads that provide coupons or notify the user of media documents on sale, and a software manufacturer may notify the user of software related to the media document that the user is consuming (e.g., an ad for a game based on a movie that the user is viewing.) One use for which these techniques may be particularly advantageous comprises the provision of an ad-supported version of an electronic media document, such as a magazine or book. The ads may include ads for a non-ad-supported version of the same electronic media document, e.g., an electronic book that does not contain ads that might disrupt the flow of reading as in the ad-supported version of the electronic book.

In a variation of the foregoing embodiment, ads received from the outside source may be provided with an expiration date, beyond which an ad should not be selected for rendering in the advertisement. When the date is reached, the ad may be removed from selection, e.g., by deactivating the ad or by removing it from the advertisement database. New ads may also be inserted to replenish the database with current ads. In this manner, the freshness of the ads in the ad memory 28 may be promoted.

The electronic media document rendering component 35 is in operable communication with an electronic media document memory component 32. Upon user interaction with the electronic media document rendering component 35, the electronic media document memory component 32 responds by retrieving the electronic media document and rendering the electronic media document for the user. When the user's interaction with the electronic media document indicates a bookmark insertion point, e.g., when the user interaction indicates a stopping point in the user's reading of the electronic media document, the system 20 inserts an electronic representation of a bookmark at the bookmark insertion point, where the ad rendering component 30 renders an ad from the ad memory 28 within the electronic representation of the bookmark. As another example, the stopping point can be recorded such that upon re-opening of the electronic media document at the insertion point, the ad rendering component 30 renders an ad from the ad memory 28 within the electronic representation of the bookmark.

It will be understood that rendering of the bookmark can occur in one embodiment, e.g., when the user is connected to a remote ad database via the electronic media document rendering component 35. In an alternative embodiment, the ads may be stored locally in the electronic media document rendering component 35 and then rendered upon user re-opening of the electronic media document.

Figure 4:
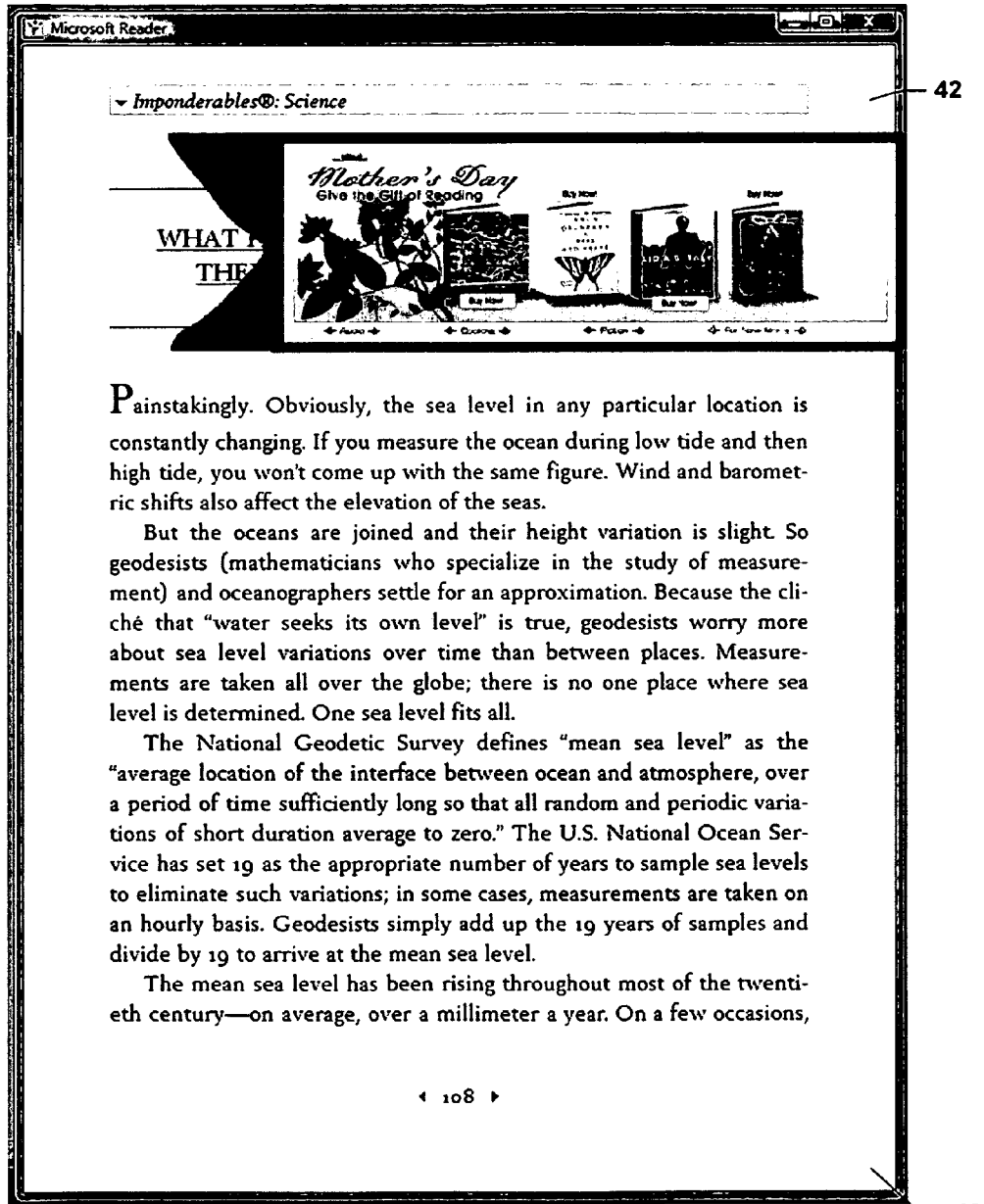
FIG. 4 is a screen shot of a landscape view of an electronic representation of a bookmark in accordance with an embodiment that utilizes the techniques described herein.

The electronic representation of the bookmark may take various forms. For example, FIG. 3 illustrates a screenshot 30 of an electronic representation of a bookmark 32 having an ad overlaid thereon. In the embodiment illustrated, the bookmark 32 is rendered in a portrait mode. Another embodiment is illustrated in FIG. 4, depicting a screenshot 40 of an electronic representation of a bookmark 42 having an ad overlaid thereon in which the bookmark is rendered in landscape mode. In yet another embodiment, the ad may be rendered on the bookmark as an ad transition.

The ad selected from ad memory 28 may be based upon one or more criteria. In one embodiment, the criteria may include at least one user descriptor stored demographic information supplied by the user at the time of purchase of the electronic media document. Such demographic information can include information that would be of interest to an advertiser, author, owner of the intellectual property associated with the electronic media document, content provider or provider of the electronic media document or their affiliates, among others. Examples of information that might be requested include but are not limited to the individual's name, address, email address, age, gender, billing information (e.g., credit card or banking information), race, educational status, educational history, employment status, employment history, past or present employment duties, activities, viewing preferences, listening preferences, reading preferences, hobbies, food preferences, beverage preferences, and email preferences.

Figure 5:
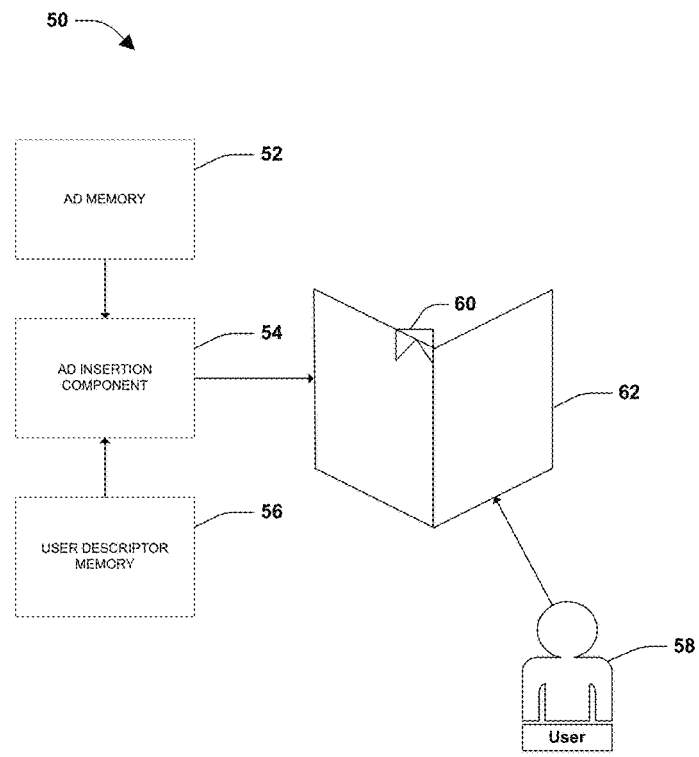
FIG. 5 is component block diagram illustrating a reader descriptor component in accordance with an embodiment that utilizes the techniques described herein.

FIG. 5 illustrates a component block diagram of a user descriptor component 50 in accordance with an embodiment of these techniques. The user descriptor component 50 comprises an ad memory 52 in conjunction with a user descriptor memory 56 operably coupled to an ad insert component 54. Upon insertion by the user 58 of a bookmark 60 in the electronic media document 62 at a bookmark insertion point, the ad insert component 54 overlays an ad on the bookmark 60 while selecting an ad from the ad memory 52 based on the criteria supplied by the user 58 and stored in the user descriptor memory 56.

Alternatively or additionally, the ad selected from the ad memory (e.g., 28 of FIG. 2) may be selected based upon at least one criterion related to the electronic media document. For example, where the user is reading an electronic book by a particular author, the ad selected may be related to additional books by the same author. In another embodiment, the ad selected may be based upon the content of the electronic media document at the bookmark insertion point of the bookmark selected by the user.

Figure 6:
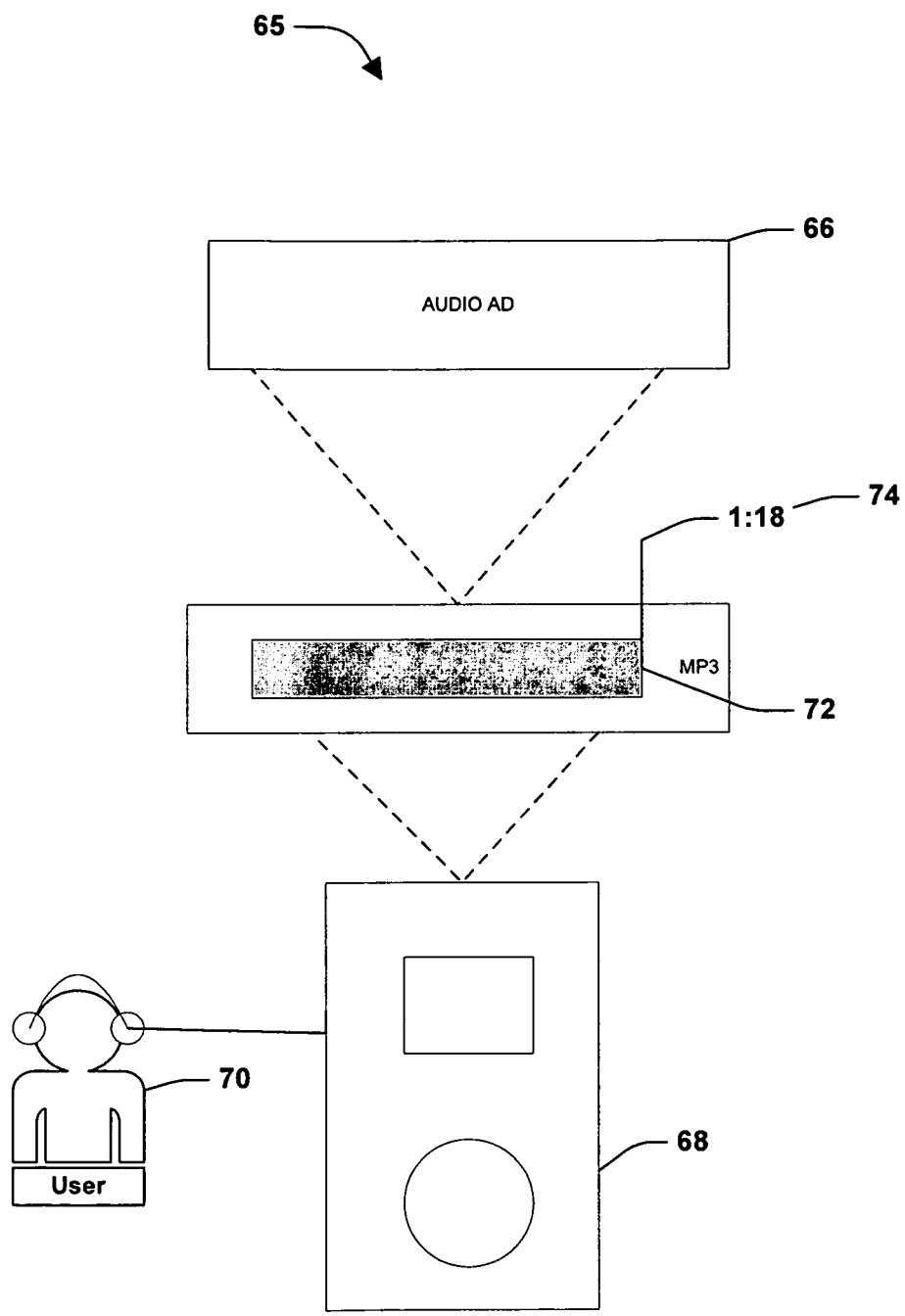
FIG. 6 is a component block diagram illustrating an audiobook in accordance with an embodiment that utilizes the techniques described herein.

In addition to the at least one criterion for the selection of the ad from the ad memory 28, the ad may be rendered as one or more ad types. As used herein, the ad type may refer to (e.g.) a text ad, a video ad, an audio ad, a graphic ad, an audiovisual ad, an audio recording, and/or a website link. For example, FIG. 6 illustrates a component block diagram of an audiobook 65 in accordance with an embodiment of these techniques, in which the ad is an audio ad 66 rendered by an MP3 player 68. The user 70 selects a bookmark insertion point for stopping 72, at which time 74 an audio ad 66 is played for the user 70.

In one embodiment, upon rendering of the electronic representation of the bookmark, action may be taken by the user to dismiss the bookmark. Such dismissal may comprise an active action, including (e.g.) selection of an expansion icon; selection in a frame box, activation of a dismissal control on the side; below or above the ad; selecting or roll over of selected portions or highlights of the ad; passing or hovering over the ad or the bookmark with a pointing device; or other forms of user-initiated and controlled actions or other conditions. Alternatively or additionally, dismissal of the bookmark may be passive such that the bookmark is allowed to fade out after a predetermined amount of time.

Figure 7:
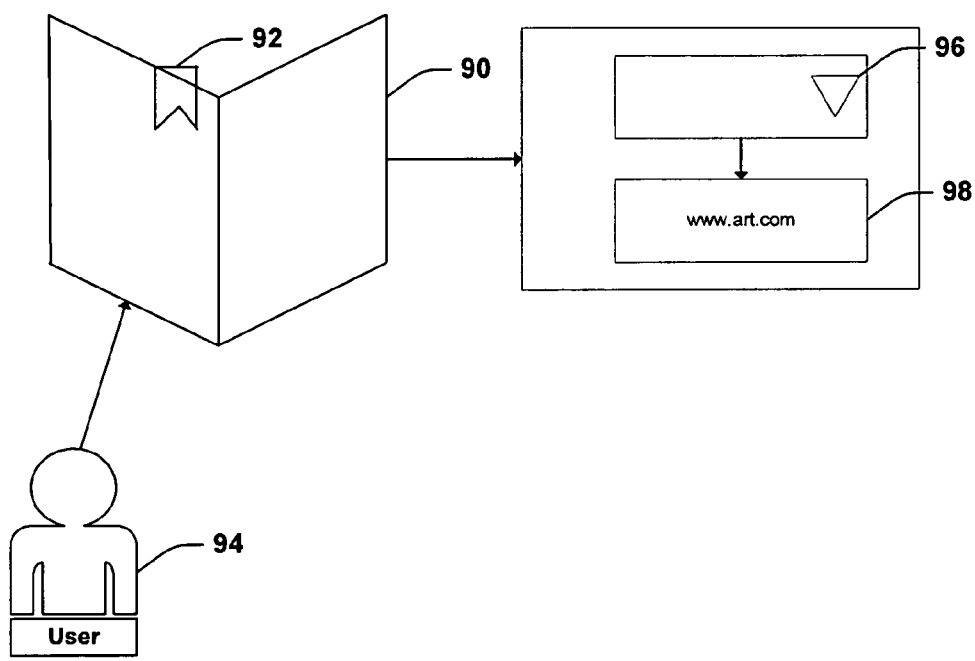
FIG. 7 is a component block diagram illustrating an active dismissal action in accordance with an embodiment that utilizes the techniques described herein.

In one embodiment, interaction by the user with the bookmark, for example, by clicking on a displayed bookmark, enables the user to view further information/content related to the ad (e.g., relating to the advertiser and/or the advertised product.) The illustration of FIG. 7 depicts a component block diagram of an electronic media document 90 having an electronic representation of a bookmark 92 inserted at a bookmark insertion point in the electronic media document 90 by the user 94. Rendered within the electronic bookmark 92 is an ad comprising a website link 96. When the user 94 interacts with the bookmark 92 by clicking on the website link 96, the user 94 is directed to the website 98 advertised on the bookmark 92.

Figure 8:
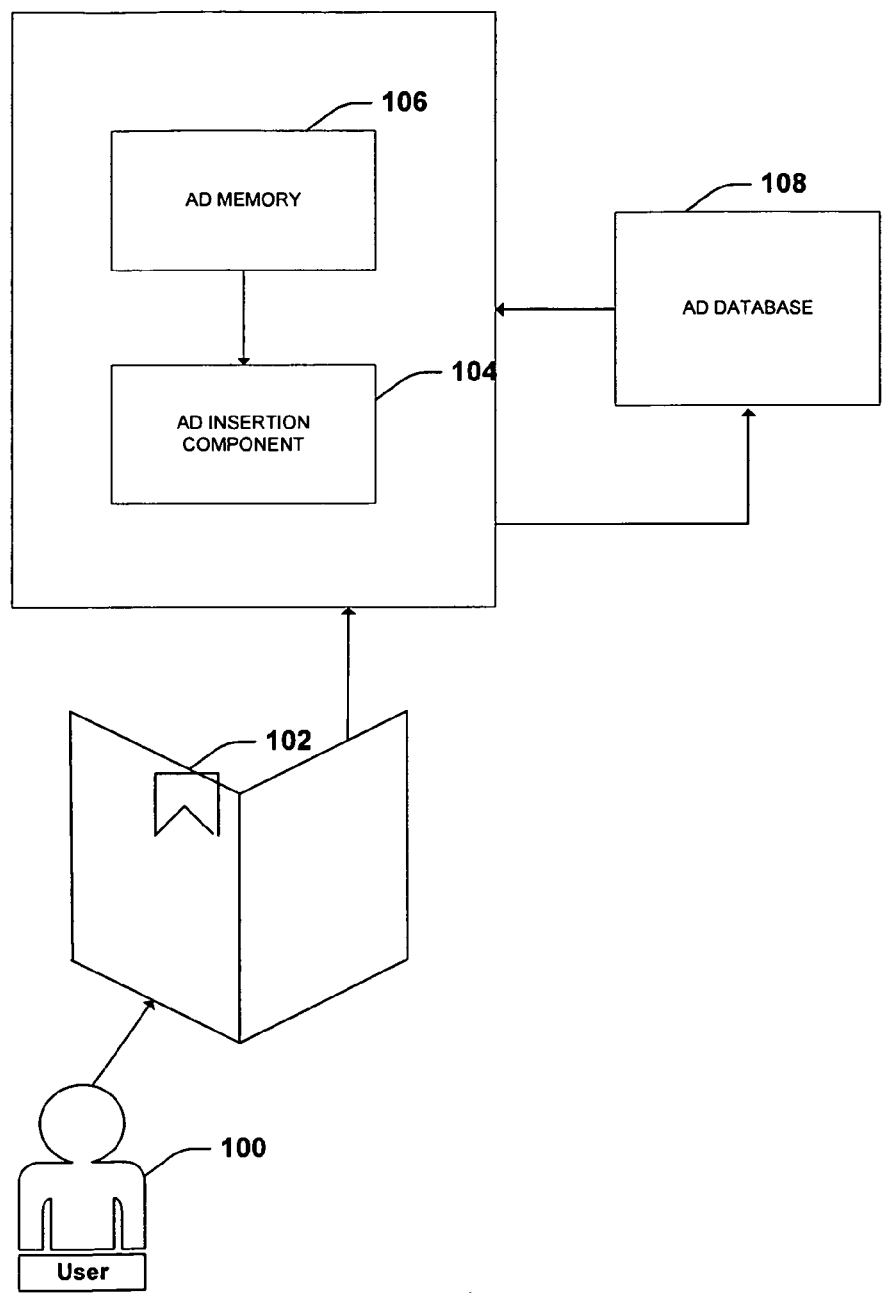
FIG. 8 is a component block diagram illustrating a notice component in accordance with an embodiment that utilizes the techniques described herein.

In another embodiment, interaction by the user with the bookmark provides notice to outside source of the instance of the rendered ad upon the rendering of the ad. As illustrated in FIG. 8, when the user 100 interacts with the bookmark 102, the ad insert component 104 overlays an ad selected from the ad memory 106 on the bookmark 102. Notice may be provided, e.g., to an ad database 108 maintained by an outside source providing the ad or tracking the rendering thereof. In this manner, information, including but not limited to the type of electronic media document being read by the user 100, the advertised product of interest to the user 100, and the like, may be collected by an outside source. In one such embodiment, the notice may comprise a request for an ad to be rendered in the bookmark representation, to which the outside source may respond by providing an ad and by recording the request for the ad. In other such embodiment, the notice may comprise a notice that the ad has been rendered, and/or that the user has dismissed the ad, and/or that the user has interacted with the ad to receive more information. These techniques may be used, e.g., to track the placement of ads in various electronic media documents in order to provide an advertisement revenue stream from advertisers to one or more of an author, a publisher, a software or hardware device manufacturer or retailer, a retail outlet such as a bookstore, etc. In another such embodiment, the notice may include information collected about the user (e.g., the user's demographic information) and/or the user's usage of the electronic media document (e.g., the number of times the user has consumed the electronic media document.) Such information may be useful to the outside source in many ways, e.g., for identifying target markets of the electronic media document, and/or for selecting targeted ads to send to the user based upon the information.

Figure 9:
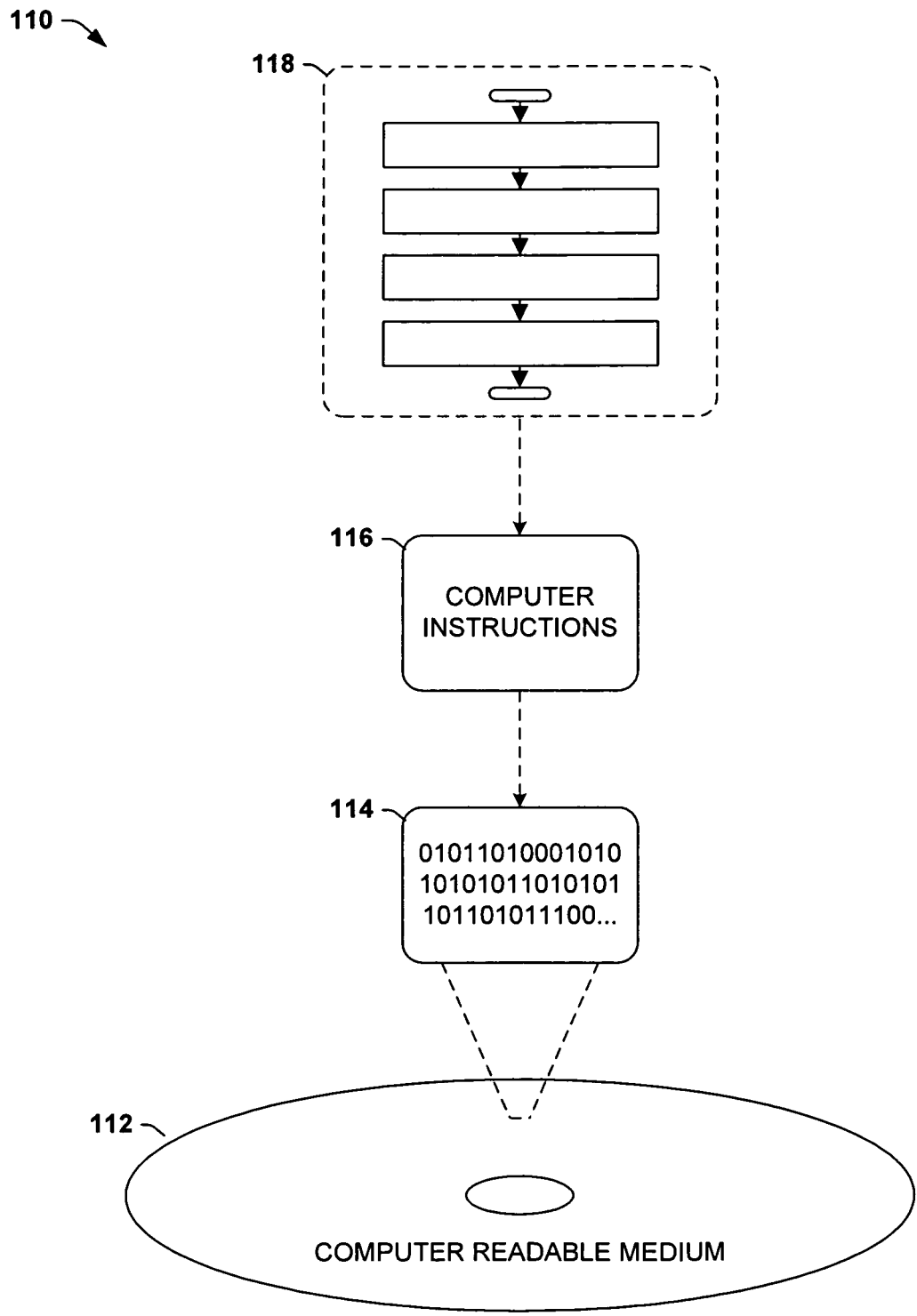
FIG. 9 is an illustration of an exemplary computer-readable medium comprising processor-executable instructions configured to embody the techniques disclosed herein.

Another embodiment (which may include some or all of the technique variations described above) involves a computer-readable medium comprising processor-executable instructions configured to apply the techniques presented herein. An exemplary computer-readable medium that may be devised in these ways is illustrated in FIG. 9, wherein the implementation 110 comprises a computer-readable medium 112 (e.g., a CD-R, DVD-R, or a platter of a hard disk drive), on which is encoded computer-readable data 114. This computer-readable data 114 in turn comprises a set of computer instructions 116 configured to operate according to the principles set forth herein. In one such embodiment 118, the processor-executable instructions 116 may be configured to perform a method of rendering an ad at a bookmark insertion point of an electronic media document, such as the exemplary method 10 of FIG. 1. In another such embodiment, the processor-executable instructions 116 may be configured to implement a system for rendering an advertisement overlaying an electronic representation of a bookmark at a bookmark insertion point within an electronic media document, such as the exemplary system 20 of FIG. 2. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it may be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, implemented at least in part via a processor, comprising:
   detecting a suggested bookmark for electronic media, a location of the suggested bookmark for the electronic media based at least in part on monitored interaction of a user with the electronic media; and
   rendering an advertisement for the suggested bookmark, the rendering comprising overlaying the advertisement at the location.

2. The method of claim 1, the advertisement comprising at least one of an audible advertisement or a visual advertisement.

3. The method of claim 1, comprising deactivating the advertisement at an expiration dates.

4. The method of claim 1, the rendering based at least in part on a re-opening of the electronic media.

5. The method of claim 1, comprising connecting to an advertising database to select the advertisement.

6. The method of claim 1, content of the advertisement based at least in part on a criterion related to the electronic media.

7. The method of claim 1, the advertisement comprising at least one of a text, a video, audio, a graphic, audio visual, or a website link.

8. The method of claim 1, comprising dismissing the advertisement based at least in part on at least one of a user action or a period of time.

9. The method of claim 8, the dismissing comprising fading the advertisement.

10. The method of claim 1, comprising providing for direction to content related to the advertisement based at least in part on user interaction with the advertisement.

11. A system, implemented at least in part via a processor, comprising:
    an advertisement insertion component configured to detect a suggested bookmark for electronic media, a location of the suggested bookmark for the electronic media based at least in part on monitored interaction of a user with the electronic media; and
    an advertisement rendering component configured to render an advertisement for the suggested bookmark by overlaying the advertisement at the location.

12. The system of claim 11, comprising an advertisement database configured to track user activity related to the suggested bookmark.

13. The system of claim 11, the advertisement insertion component configured to dismiss at the advertisement based at least in part on a user action.

14. The system of claim 11, the advertisement comprising at least one of text, video, audio, a graphic, audio visual, or a website link.

15. The system of claim 11, the advertisement rendering component configured to render the advertisement based at least in part on a re-opening of the electronic media.

16. The system of claim 11, content of the advertisement based at least in part on content of the electronic media.

17. A computer-readable storage device comprising computer-executable instructions, which when executed at least in part via a processor perform a method, comprising:
    detecting a suggested bookmark for electronic media, a location of the suggested bookmark for the electronic media based at least in part on monitored interaction of a user with the electronic media; and
    rendering an advertisement for the suggested bookmark, the rendering comprising overlaying the advertisement at the location.

18. The computer-readable storage device of claim 17, comprising deactivating the advertisement at an expiration date.

19. The computer-readable storage device of claim 17, comprising connecting to an advertising database to select the advertisement.

20. The computer-readable storage device of claim 17, comprising dismissing the advertisement based at least in part on at least one of a user action or a period of time.

* * * * *